Figure 1:
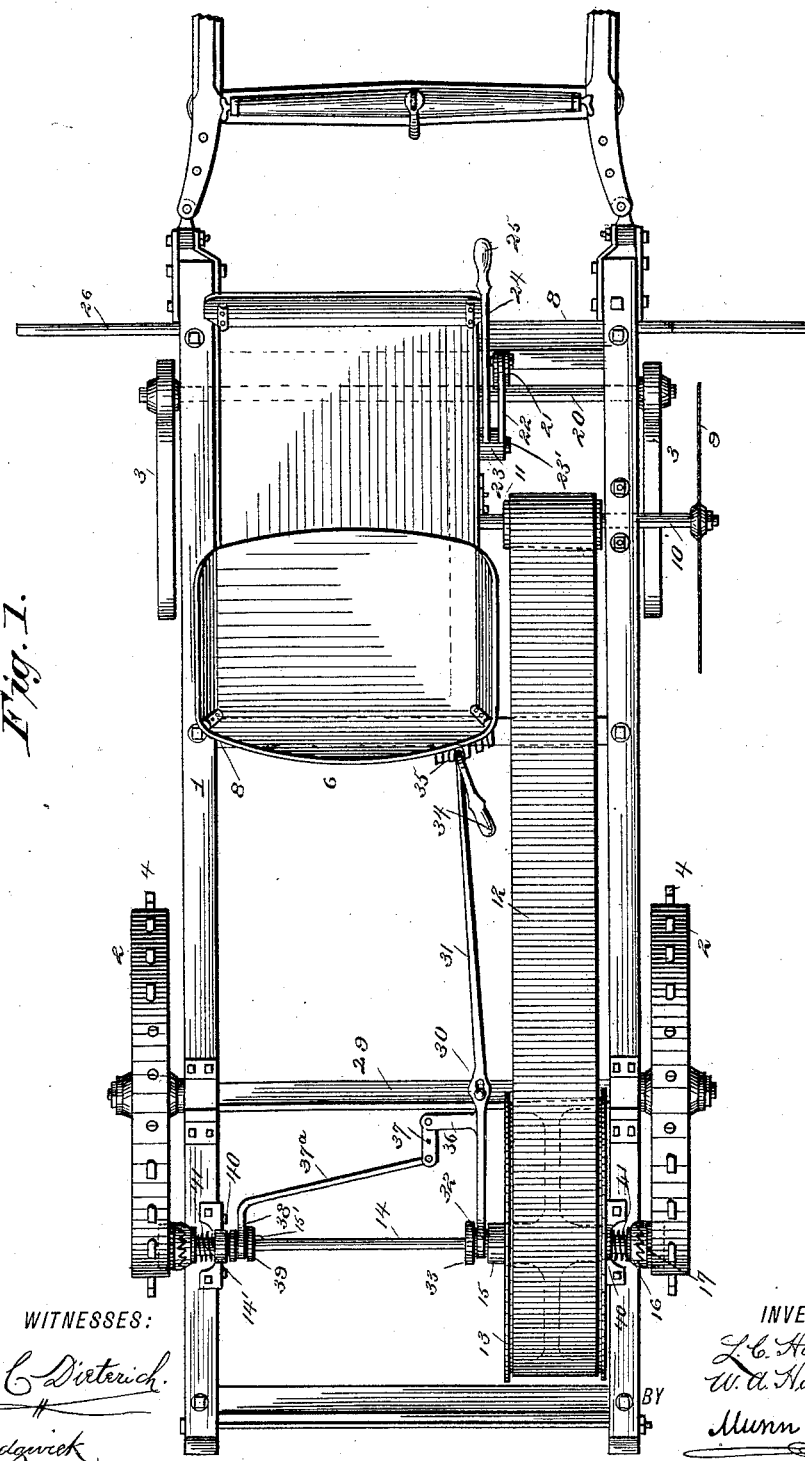

(No Model.) 3 Sheets—Sheet 1.

L. C. HARTUNG & W. A. HAUSSNER.
ICE CUTTING MACHINE.

No. 390,365. Patented Oct. 2, 1888.

WITNESSES:
Phil. C. Dieterich
C. Sedgwick

INVENTOR
L. C. Hartung
W. A. Haussner
BY Munn & Co
ATTORNEY

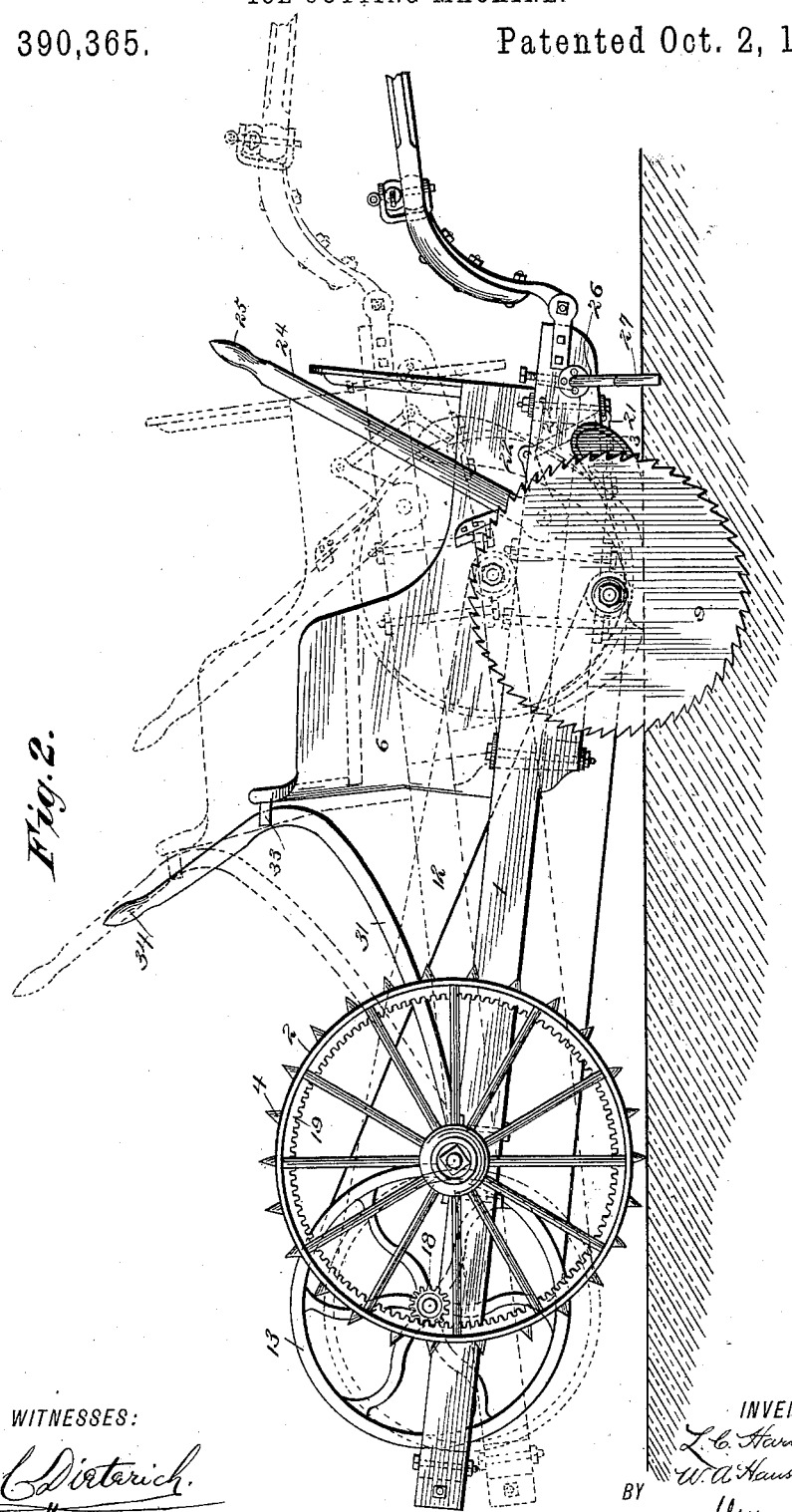

(No Model.) 3 Sheets—Sheet 3.
L. C. HARTUNG & W. A. HAUSSNER.
ICE CUTTING MACHINE.
No. 390,365. Patented Oct. 2, 1888.
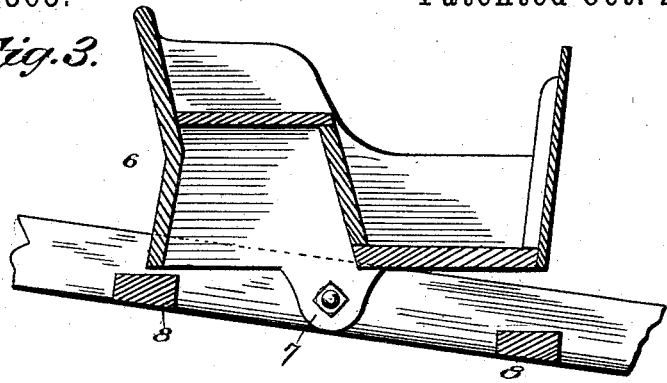
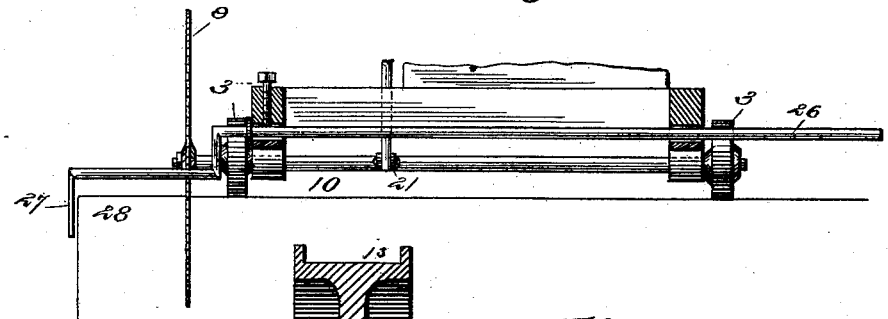
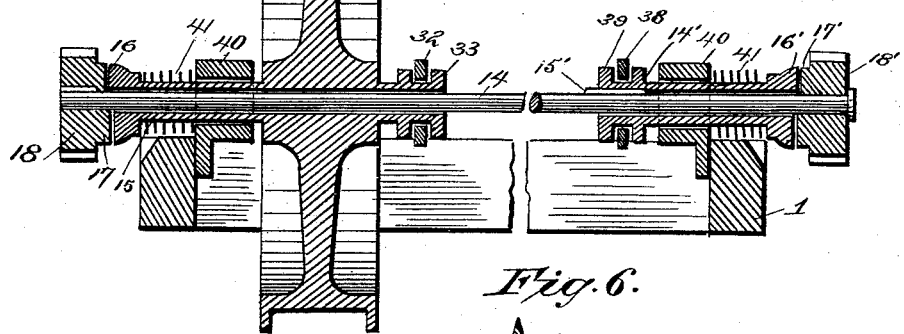
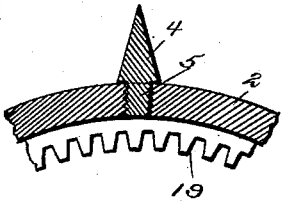
WITNESSES:
Phil. C. Dieterich.
C. Sedgwick
INVENTOR
L. C. Hartung
W. A. Haussner
BY Munn & Co.
ATTORNEY

UNITED STATES PATENT OFFICE.

LOUIS C. HARTUNG AND WILLIAM A. HAUSSNER, OF STILLWATER, MINNESOTA.

ICE-CUTTING MACHINE.

SPECIFICATION forming part of Letters Patent No. 390,365, dated October 2, 1888.

Application filed March 29, 1888. Serial No. 268,788. (No model.)

*To all whom it may concern:*

Be it known that we, LOUIS C. HARTUNG and WILLIAM A. HAUSSNER, of Stillwater, in the county of Washington and State of Minnesota, have invented a new and Improved Ice-Cutting Machine, of which the following is a full, clear, and exact description.

This invention relates to machines for cutting ice which are adapted to be drawn over the surface of the ice, and have their cutting mechanism adjustably thrown in and out of position to cut the ice.

The invention will be set forth in the following description, and pointed out in the claims.

Reference is to be had to the accompanying drawings, forming a part of this specification, in which similar figures of reference indicate corresponding parts in all the views.

Figure 1 is a plan view of the invention with the draft mechanism broken away. Fig. 2 is a side view thereof. Fig. 3 is a detail view showing the driver's seat. Fig. 4 is a detail view, partly in section and broken away, of the forward portion of the machine. Fig. 5 is a detail view of the clutch mechanism for engaging and detaching the operating mechanism; and Fig. 6 is a detail, partly in section, of a spike in one of the drag-wheels.

In the construction of this device a frame, 1, is mounted at its rear on wheels 2, and at its front on runners 3. The wheels 2 are provided on their peripheries with spikes 4, which engage the ice and aid the wheels in turning. The spikes 4 are removably secured to the wheels 2 by screw-threaded shanks 5 or other suitable means, so that if a spike breaks another may be supplied.

At the forward part of the frame 1 is located a tilting driver's seat, 6, having lugs 7 on its bottom pivoted to the frame of the machine. Beneath the forward and rear ends of the driver's seat are located cross-strips 8, on which one end of the seat rests, according as the forward end of the frame 1 is raised or lowered and the seat tilted, thereby always maintaining the driver's seat in a horizontal position.

On one side of the frame, adjacent to its forward end, is located a circular saw, 9, on the end of a shaft, 10, mounted in frame 1, and having a small pulley, 11, connected by a driving-belt, 12, with a driving-wheel, 13, mounted on a shaft, 14, in the rear portion of frame 1. In order to release the said driving mechanism from engagement with the draft-wheels 2, the wheel 13 has its hub formed with a tubular projection or sleeve, 15, having a clutch-section, 16, at its outer end, which is adapted to interlock with the clutch-section 17 of the pinion 18, fast on one end of the shaft 14. On the other end of the shaft 14 is loosely mounted a pinion, 18', provided with a clutch-section, 17', adapted to engage a clutch-section, 16', on a sliding sleeve, 14', connected with the shaft 14 by a spline, 15'. The pinions 18 and 18' mesh with an internal gear, 19, on the wheels 2.

The shaft 14 is always in gear with one of the wheels 2 by means of pinion 18, and the wheel 13 and the pinion 18' are thrown into engagement with shaft 14 by means of sleeves 15 and 14'. The sleeves 15 and 14' are thrown in and out of engagement with pinions 18 and 18' by a mechanism connected with the driver's seat, constructed as hereinafter described.

The runners 3, which are in the shape of rockers, are secured at their forward ends to a shaft, 20, mounted in frame 1. The shaft 20 has an arm, 21, which is pivotally connected by a link, 22ª, with an arm, 22, mounted on a sleeve, 23, on a pin, 23', in frame 1, and having a lever, 24, with handle 25 adjacent to the driver's seat 6. By this means the shaft 20 may be rotated by pulling back upon the lever 24, which causes the forward end of the frame 1 to be raised, the rocker-shaped runners 3 moving with the shaft 20, their forward end rising with the frame and their rear end pressing on the surface of the ice, as shown in dotted lines in Fig. 2. In this way the saw 9 is raised and lowered to cut the ice, the full depth of cut being shown in Fig. 2, with the runners 3 lying in horizontal position.

If desired, the lever 24 may be provided with any suitable means to hold it in adjusted position, according to the depth of cut by saw 9 desired. The line of travel of the machine and the width of the ice to be cut are determined by a crank-rod, 26, mounted in the front of the frame 1, and having a depending arm, 27, which extends over the edge 28 of the sheet of ice which is being cut. The crank-rod 26, being loosely mounted in frame 1, may be easily adjusted laterally from the frame 1, according to the width desired to be cut. The rod 26 may be of any form preferred and be held in adjustment by any convenient means.

The saw-operating mechanism is disconnected from the draft-wheels 2 by means of the following mechanism: To the rear fixed axle, 29, is loosely pivoted, as at 30, a rod, 31, having its rear forked end, 32, engaging an annular groove, 33, in the sleeve 15. The rod 31 extends forward to the driver's seat 6, and upward behind the same, terminating in a handle, 34, and may be adjustably connected with a rack, 35, owing to its loose pivotal connection at 30, which permits an endwise movement of rod 31. The latter is formed adjacent to and to the rear of its pivot-point with a lateral arm, 36, which is pivoted to one end of a lever, 37, to the other end of which is pivoted a rod, 37ª, having a bent forked end, 38, engaging an annular groove, 39, in the sleeve 14'. The sleeves 15 and 14' project through brackets 40 and coiled springs 41 are located between their clutch-sections 16 and 16' and the brackets 40, the coiled springs acting to aid in throwing the sleeves 15 and 14' into engagement with the pinions 18 and 18'.

In lieu of the mechanism herein set forth for moving the saw-operating mechanism in and out of engagement with the draft-wheels 2 any well-known clutch mechanism may be employed.

In operation, the machine being drawn forward on the ice, the spikes 4 engage the latter, causing the wheels 2 to turn, and thereby acting on the shaft 14, thrown into engagement with wheel 13 and pinion 18', to move the belt 12, pulley 11, and revolve the saw 9. The forward part of the frame 1 is lowered by moving the lever 24 forward, which rotates the shaft 20, bringing the runners 3 to a horizontal position and causing the weight of the frame to force the revolving saw 9 down into the ice, and as the machine advances cutting the ice to the required depth.

By means of this invention the ice is easily and effectively cut, with little or no difficulty in handling the machine.

Having thus described our invention, we claim as new and desire to secure by Letters Patent—

1. In an ice-cutting machine, the combination, with the main frame and traction-wheels upon which the rear end of the frame is mounted, of a rock-shaft at the forward end of the frame, runners connected at their forward ends to the ends of the rock-shaft, and a system of levers for operating said rock-shaft, substantially as described.

2. In an ice-cutting machine, the combination, with the main frame, of a rock-shaft, 20, mounted in the forward part thereof and provided with the arm 21, runners 3, in the shape of rockers and having their forward ends attached to the said rock-shaft, the arm 22, pivoted to the frame and provided with the lever 24, and the link 22ª, pivoted to the arms 21 and 22, substantially as herein shown and described.

3. An ice-cutting machine consisting of frame 1, mounted on traction-wheels 2 at one end and runners 3 at the other, the circular saw 9, mounted on shaft 10, having pulley 11, the wheel 13, connected with pulley 11 by band 12, and having a sliding sleeve, 15, with clutch-section 16 and retracting-spring 41, and mounted in bracket 40, shaft 14, extending through sleeve 15 and having pinion 18, with clutch-section 17, fixed on one end, and pinion 18', with clutch-section 17', loosely mounted on the other, the pinions 18 and 18', meshing with an internal gearing on wheels 2, the sliding sleeve 14', mounted in bracket 40, and having retracting-spring 41 and clutch-section 16', the rod 31, connected with fixed shaft 29 by loose joint 30, and having one end with handle 34, engaging rack 35, and the other forked end, 32, engaging groove 33 of sleeve 15, and arm 36, lever 37, and rod 37ª, with bent forked end 38, engaging groove 39 of sleeve 14', substantially as described.

4. An ice-machine consisting of frame 1, having one end mounted on traction-wheels 2, with internal gearing, 19, and the other end mounted on runners 3, fixed to shaft 20, with arm 21, pivotally connected to arm 22 on rotary sleeve 23, having operating-lever 24, the rotary saw 9 on shaft 10, having pulley 11, the wheel 13, with spring-actuated sliding sleeve 15 and clutch 16, the driving-band 12, connecting wheel 13 with pulley 11, shaft 14, extending through sleeve 15, and having pinion 18, with clutch 17 fixed on one end thereof, and pinion 18', with clutch 17', loosely mounted on the other end, the pinions 18 and 18', meshing with gearing 19 on wheels 2, sliding sleeve 14', engaging spline 15' on shaft 14, and having retracting-spring 41 and clutch 16', and the endwise-movable rod 31 and rack 35, the rod 31 having forked end 32 engaging sleeve 15, and bar 36, lever 37, and rod 37ª, with forked end 38 engaging sleeve 14', substantially as described.

LOUIS C. HARTUNG.
WILLIAM A. HAUSSNER.

Witnesses:
H. R. MURDOCK,
F. V. CUNFORT.